(12) United States Patent
Zheng et al.

(10) Patent No.: US 12,484,817 B2
(45) Date of Patent: Dec. 2, 2025

(54) FIXED MEMBER FOR IMPLANTED ANALYTE SENSOR AND SENSOR SYSTEM

(71) Applicant: LEADWAY (HK) LIMITED, Hong Kong (CN)

(72) Inventors: Min Zheng, Zhejiang (CN); Li Zhang, Zhejiang (CN); Jun Sun, Zhejiang (CN)

(73) Assignee: LEADWAY (HK) LIMITED, Hong Kong (CN)

( * ) Notice: Subject to any disclaimer, the term of this patent is extended or adjusted under 35 U.S.C. 154(b) by 581 days.

(21) Appl. No.: 17/293,420

(22) PCT Filed: Nov. 11, 2019

(86) PCT No.: PCT/CN2019/117011
§ 371 (c)(1),
(2) Date: May 12, 2021

(87) PCT Pub. No.: WO2020/098583
PCT Pub. Date: May 22, 2020

(65) Prior Publication Data
US 2022/0117519 A1    Apr. 21, 2022

(30) Foreign Application Priority Data
Nov. 13, 2018  (CN) .......................... 201811348478.8

(51) Int. Cl.
*A61B 5/1473* (2006.01)
*A61B 5/00* (2006.01)
(52) U.S. Cl.
CPC .......... *A61B 5/1473* (2013.01); *A61B 5/6882* (2013.01)
(58) Field of Classification Search
CPC ....... A61B 5/1473; A61B 5/6882; A61B 5/01; A61B 5/14539; A61B 5/6847;
(Continued)

(56) References Cited

U.S. PATENT DOCUMENTS

| | | | |
|---|---|---|---|
| 7,660,615 B2 | 2/2010 | VanAntwerp et al. | |
| 9,795,326 B2 | 10/2017 | Hoss et al. | |
| 2017/0127982 A1* | 5/2017 | Larson | H01R 13/6456 |

FOREIGN PATENT DOCUMENTS

| | | |
|---|---|---|
| CN | 102469964 B | 1/2015 |
| CN | 102665549 B | 7/2015 |

(Continued)

OTHER PUBLICATIONS

First Office Action issued by SIPO in CN 201811348478.8 dated Mar. 29, 2021—incl Engl lang transl. (10 pages total).
(Continued)

*Primary Examiner* — Matthew Kremer
*Assistant Examiner* — Meghan R Kumar
(74) *Attorney, Agent, or Firm* — Michael A. Whittaker

(57) ABSTRACT

Disclosed are a fixed member for an implanted analyte sensor (2) and an implanted analyte sensing system comprising the fixed member. The fixed member is used for a sensor (2) having a double-sided microelectrode. The fixed member comprises a support portion (3), an accommodating portion (1), a conductive path (400) and a through hole (5); the accommodating portion (1) is composed of a top part, a side wall (13), a bottom (12) and an inner wall (14); the through hole (5) is located on the support part (3), and an opening at one end of the through hole is formed at the bottom (12); the conductive path (400) is located on the accommodating portion (1); and the conductive path (400) comprises at least two end portions (41, 42). The fixed member relatively reduces the fabrication difficulty of the double-sided microelectrode sensor (2) and effectively lowers the cost. Furthermore, the fixed member has a simple structure and a low level of manufacturing process, making the replacement of the sensor (2) simple and convenient.

16 Claims, 13 Drawing Sheets

(58) Field of Classification Search
CPC .......... A61B 2562/227; A61B 5/14503; A61B 5/14532; A61B 5/6879; A61B 5/14546
See application file for complete search history.

(56) References Cited

FOREIGN PATENT DOCUMENTS

| | | |
|---|---|---|
| CN | 104887242 A | 9/2015 |
| CN | 103750819 B | 8/2016 |
| CN | 108352658 A | 7/2018 |
| CN | 109846494 A | 6/2019 |
| CN | 209360699 U | 9/2019 |
| WO | 2020098583 A1 | 5/2020 |

OTHER PUBLICATIONS

International Search Report and Written Opinion issued in PCT/CN2019/117011 dated Feb. 12, 2020—incl Engl lang transl (20 pages total).

International Preliminary Report on Patentability issued in PCT/CN2019/117011 dated May 18, 2021—incl Engl lang transl (13 pages total).

\* cited by examiner

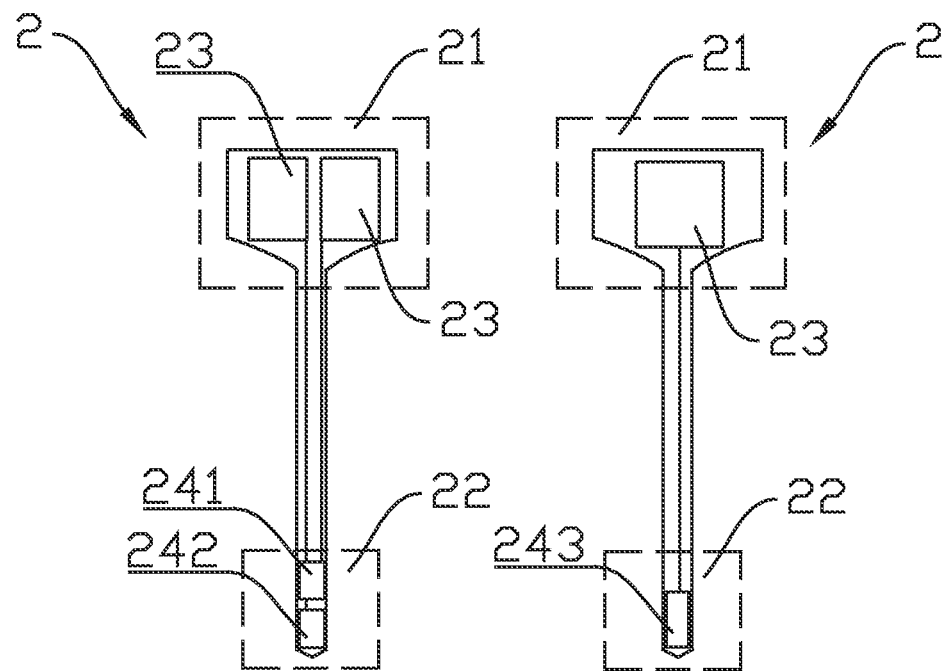
Figure 1
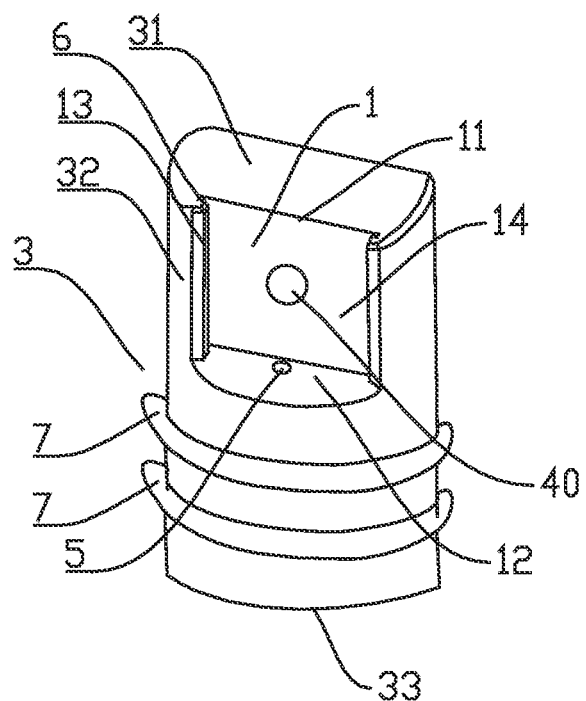
Figure 2-1-a

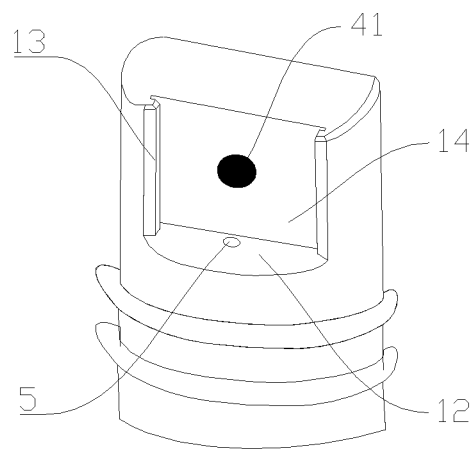
Figure 2-1-b
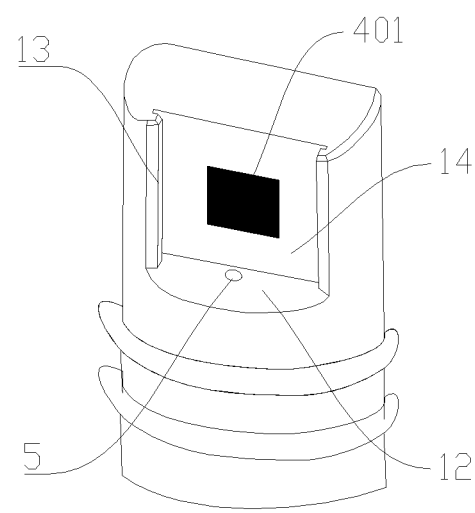
Figure 2-1-c

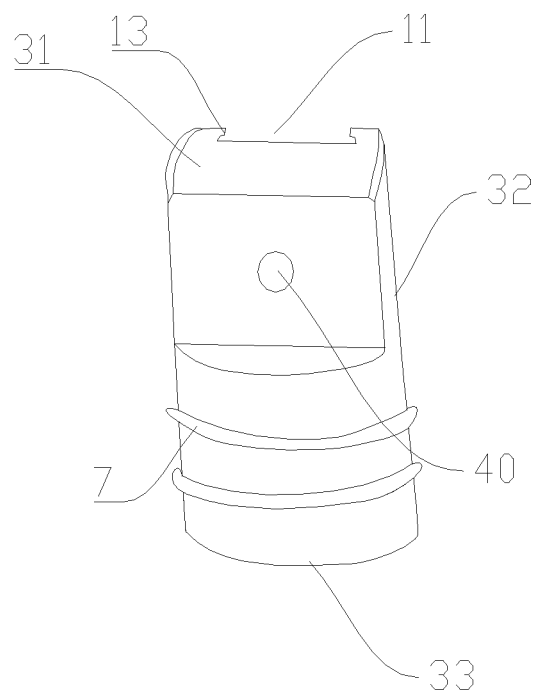
Figure 2-1-d
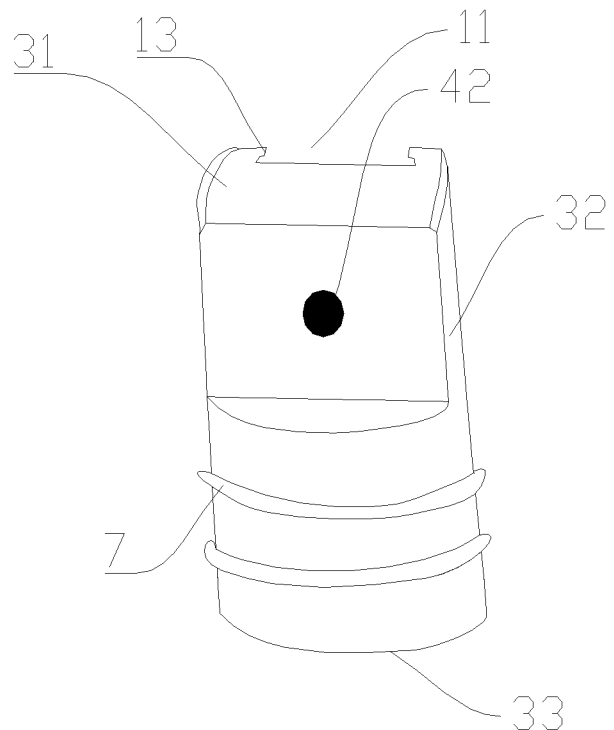
Figure 2-1-e

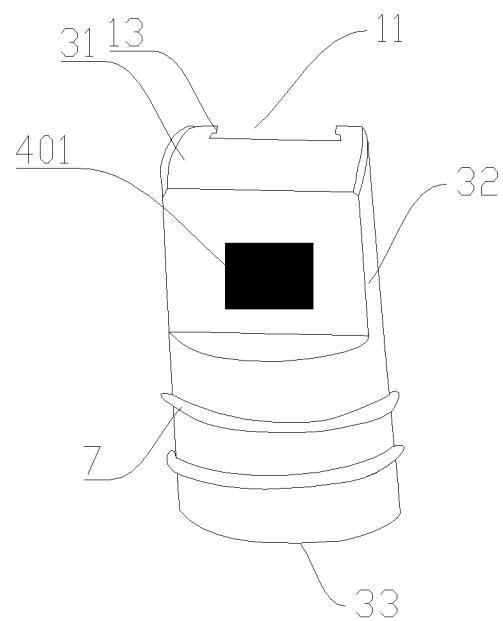
Figure 2-1-f
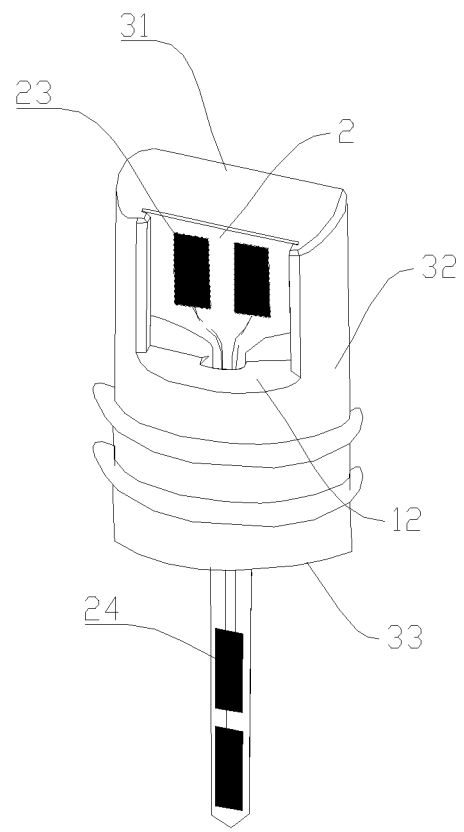
Figure 2-1-g

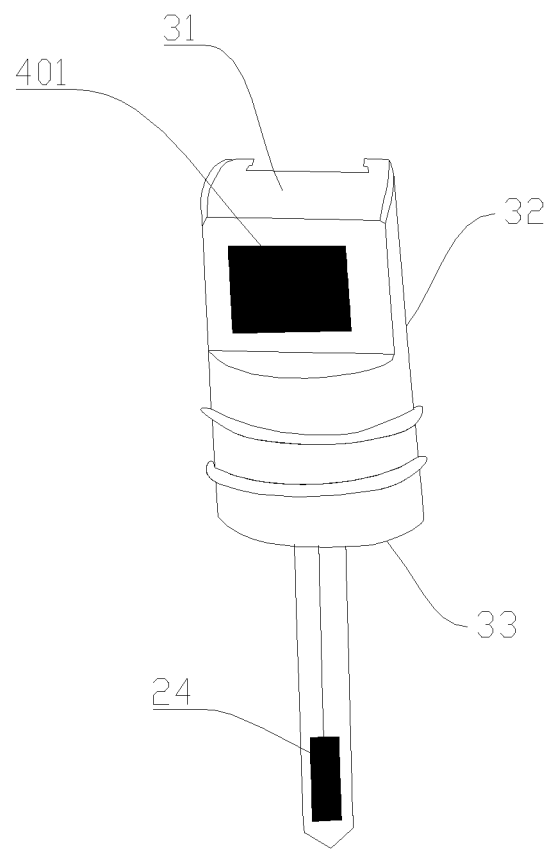
Fgure 2-1-h
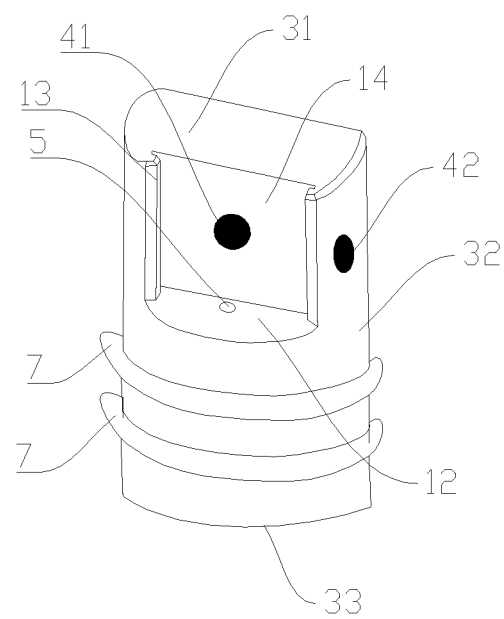
Figure 2-2-a

Figure 2-2-b

FIXED MEMBER FOR IMPLANTED ANALYTE SENSOR AND SENSOR SYSTEM

FIELD OF THE INVENTION

The present invention relates to a fixing member for an implantable analyte sensor and an implantable analyte sensor system including the fixing member, and belongs to the technical field of electroanalytical chemical detection.

BACKGROUND OF THE INVENTION

With regard to conventional analyte detection technologies, taking a patient suffering from diabetes as an example, the glucose content of blood needs to be regularly tested, then a puncture needle is required to puncture the skin to collect blood, and the blood is tested by means of colorimetry, electrochemical analysis or optical detection. These methods are not only cumbersome, but also increase patient's burden. Therefore, in order to solve the above problems and continuously test changes in the concentrations of analytes in the body, many devices for continuous analyte test have been developed. In the prior art, the electrochemical analysis is usually used. Accordingly, a sensor used for testing analytes is equipped with at least a working electrode, a counter electrode and a reference electrode. These electrodes are generally on the same side, or distributed on two opposite sides. For example, patent Nos. CN102665549B, CN104887242A, and CN103750819B disclose a method for distributing electrodes on the same side of a sensor. This distribution method requires multiple electrodes to be distributed in a limited area, which undoubtedly increases the process difficulty and technical requirements. For another example, patent Nos. CN102469964B and U.S. Pat. No. 9,795,326B2 disclose a method for distributing electrodes on two sides of a sensor. This method can reduce the process difficulty of sensor production, but a fixing member for fixing the sensor needs to be provided with electric contacts on different sides, thereby increasing the complexity of the fixing member or the difficulty in mounting the sensor.

SUMMARY OF THE INVENTION

In view of the shortcomings of the prior art, the present invention provides a fixing member for an implantable analyte sensor, which is particularly suitable for a sensor with double-sided microelectrodes. The basic idea of the present invention is to provide a first end portion on a side facing a microelectrode (a back electrode), wherein the first end portion is electrically connected to an interface of the back electrode. In addition, a second end portion is electrically connected to the first end portion, and the second end portion is connected to a corresponding interface of a sensor current data generation device, so that the sensor current data generation device can be connected to the microelectrodes of the sensor with a double-sided structure for testing analytes. The present invention provides a fixing member for an implantable analyte sensor, the fixing member includes a supporting portion, a receiving portion, a conductive path and a through hole; the supporting portion includes supporting portion side walls, a supporting portion top and a supporting portion bottom; the receiving portion is located in the supporting portion side walls in a recessed manner, and the receiving portion includes receiving portion side walls, a receiving portion inner wall, a receiving portion bottom and a receiving portion top; the conductive path includes an input end and an output end, the input end is located on the receiving portion inner wall, and the output end is located on a surface of the supporting portion; the input end and the output end are electrically connected by a connecting portion; and an opening of the through hole is located at the receiving portion bottom, and the other opening is located at the supporting portion bottom.

Preferably, the receiving portion top is open.

Preferably, at least a part of the connecting portion is located in the supporting portion.

Preferably, the input end protrudes from the receiving portion inner wall.

Preferably, the output end protrudes from the surface of the supporting portion.

Preferably, at least a part of the connecting portion is located on the surface of the supporting portion.

Preferably, a conductive sheet is provided on the receiving portion inner wall, and the conductive sheet is electrically connected to the input end; or a conductive sheet is provided on the surface of the supporting portion, and the conductive sheet is electrically connected to the output end; or a conductive sheet is respectively provided on the receiving portion inner wall and the surface of the supporting portion, and the conductive sheets are electrically connected to the input end and the output end, respectively.

Preferably, a groove is provided on the receiving portion bottom; or a groove is provided on the receiving portion side wall; or a groove is provided on the receiving portion bottom and the receiving portion side wall.

Preferably, one opening of the through hole is provided in the groove at the receiving portion bottom.

The present invention provides another fixing member for an implantable analyte sensor, which is used for a sensor with double-sided microelectrodes, the fixing member includes a supporting portion, a receiving portion, a conductive path and a through hole; the receiving portion is composed of a receiving portion top, receiving portion side walls, a receiving portion bottom and a receiving portion inner wall, and the supporting portion is connected to the receiving portion bottom to form a receiving portion bottom platform; the through hole is located on the supporting portion, with one end opened to the receiving portion bottom platform; the conductive path is located on the receiving portion; and the conductive path includes at least two end portions.

In some preferred embodiments, the conductive path includes a first end portion and a second end portion, and the second end portion is electrically connected to the first end portion.

In some preferred embodiments, the conductive path penetrates the receiving portion.

In some preferred embodiments, the conductive path is located on an outer surface of the receiving portion.

In some preferred embodiments, a part of the conductive path penetrates the receiving portion, and the other part is located on the outer surface of the receiving portion.

In some preferred embodiments, the receiving portion is provided with a conductive hole for receiving the conductive path.

In some preferred embodiments, the first end portion is located on the receiving portion inner wall, and the second end portion is located on the receiving portion top or side wall.

In some preferred embodiments, the conductive path further includes a third end portion located on the receiving portion; and the third end portion is electrically connected to the second end portion and the first end portion.

In some preferred embodiments, the receiving portion is provided with one to three grooves; and the grooves are located on the receiving portion inner wall or bottom.

In some preferred embodiments, the fixing member further includes a conductive sheet located on the receiving portion; and the conductive sheet is electrically connected to an end portion of the conductive path.

In some preferred embodiments, a sealing ring is further included, and the sealing ring surrounds the supporting portion side wall.

In some preferred embodiments, a connecting portion is further included, and the connecting portion is connected to the supporting portion.

On the other hand, the present invention further provides an implantable analyte sensor system, including a detection unit, a signal transmission device, and a data processing unit;

the detection unit and the signal transmission device are fixed in a housing, and a power source is further provided in the housing to supply power to electronic components in the housing; and the detection unit includes an implantable analyte sensor, the fixing member for fixing the implantable analyte sensor according to the present invention, and a sensor current data generation device.

Specifically, the fixing member includes a supporting portion, a receiving portion, a conductive path and a through hole; the receiving portion is composed of a receiving portion top, receiving portion side walls, a receiving portion bottom and a receiving portion inner wall, and the supporting portion is connected to the receiving portion bottom to form a receiving portion bottom platform; the through hole is located on the supporting portion, with one end opened to the receiving portion bottom platform; the conductive path is located on the receiving portion; and the conductive path includes at least two end portions.

In some preferred embodiments, the fixing member is fixed to a base of the housing through a connecting portion connected to the supporting portion.

In some preferred embodiments, the conductive path includes a first end portion and a second end portion, and the second end portion is electrically connected to the first end portion.

In some preferred embodiments, the conductive path penetrates the receiving portion.

In some preferred embodiments, the conductive path is located on an outer surface of the receiving portion.

In some preferred embodiments, a part of the conductive path penetrates the receiving portion, and the other part is located on the outer surface of the receiving portion.

In some preferred embodiments, the receiving portion is provided with a conductive hole for receiving the conductive path.

In some preferred embodiments, the first end portion is located on the receiving portion inner wall, and the second end portion is located on the receiving portion top or side wall.

In some preferred embodiments, the conductive path further includes a third end portion located on the receiving portion; and the third end portion is electrically connected to the second end portion and the first end portion.

In some preferred embodiments, the receiving portion is provided with one to three grooves; and the grooves are located on the receiving portion inner wall or bottom.

In some preferred embodiments, the fixing member further includes a conductive sheet located on the receiving portion; and the conductive sheet is electrically connected to an end portion of the conductive path.

The beneficial effects of the present invention are: the fixing member relatively reduces the difficulty in preparing the sensor with double-sided microelectrodes, and can effectively reduce the cost. In addition, the fixing member is simple in structure and easy to manufacture, and the replacement of the sensor is simple and convenient. Moreover, the detection efficiency of the implantable analyte sensor system with the fixing member is improved.

BRIEF DESCRIPTION OF THE DRAWINGS

In FIG. 2-1 (FIGS. 2-1-*a*, 2-1-*b*, 2-1-*c*, 2-1-*d*, 2-1-*e*, 2-1-*f*, 2-1-*g*, and 2-1-*h*), FIGS. 2-1-*a*, 2-1-*b* and 2-1-*c* are schematic diagrams of a front side of a fixing member in different embodiments, FIGS. 2-1-*d*, 2-1-*e* and 2-1-*f* are schematic diagrams of a back side of the fixing member in different embodiments, and FIGS. 2-1-*g* and 2-1-*h* are schematic diagrams of a combination of the fixing member and the sensor; and FIG. 2-2 (FIGS. 2-2-*a* and 2-2-*b*) shows schematic diagrams of the front side of the fixing member in different embodiments;

FIGS. 3-1, 3-2 and 3-3 are top views of the fixing member;

FIGS. 4-1 to 4-8 are schematic diagrams of the fixing member in different embodiments;

FIGS. 4-9 and 4-10 are schematic diagrams of the combination of the fixing member and the sensor;

FIG. 5 is a top view showing that a conductive path partially penetrates a receiving portion and is partially located on a surface of the receiving portion;

FIG. 6 is a schematic diagram of an implantable analyte sensor system.

DETAILED DESCRIPTION OF EMBODIMENTS

The following embodiments further describe the present invention. These embodiments are not used to limit the scope of the present invention, but to provide a further understanding of the present invention.

Figures 1, 4:
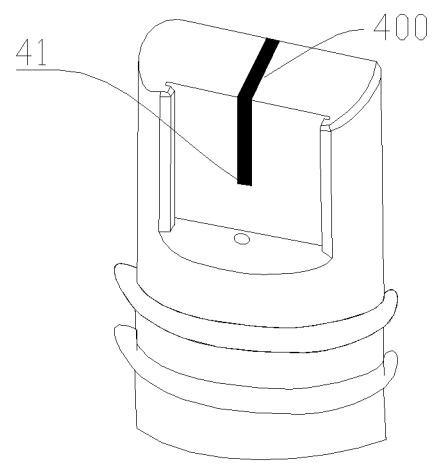
Figures 2, 4:
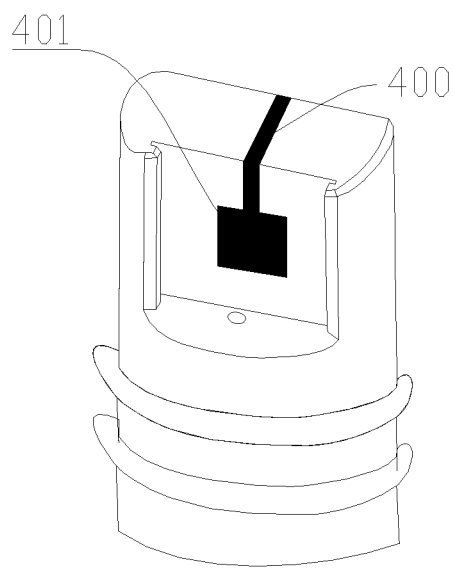
Figures 3, 4:
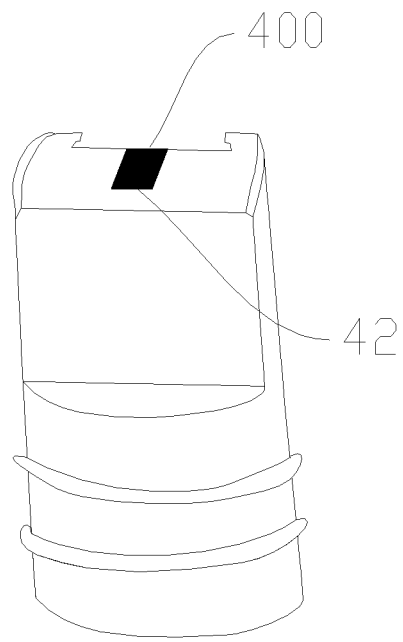
Figure 4:
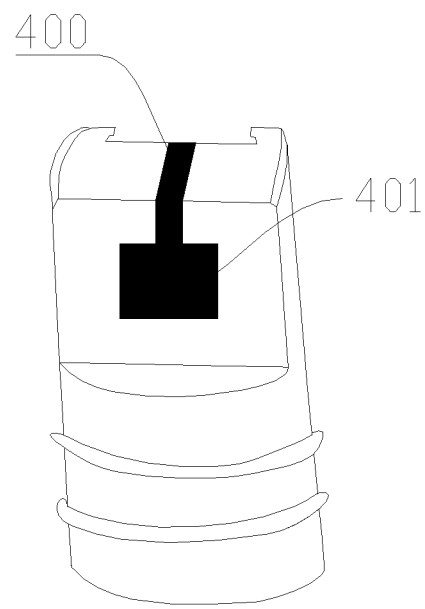
Figures 4, 5:
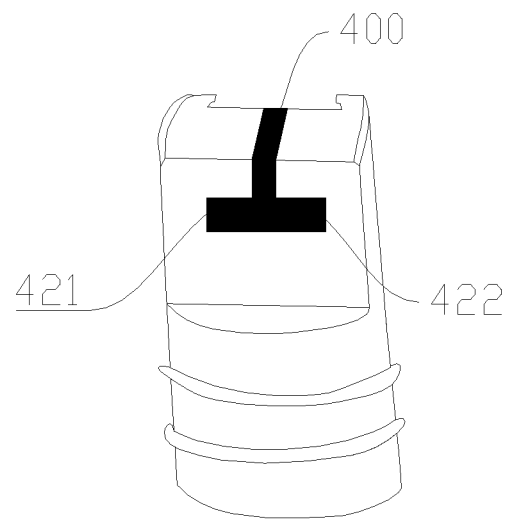
Figures 4, 5, 6:
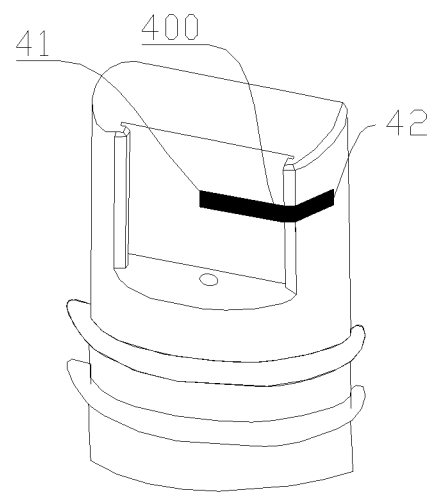
Figures 4, 5, 6, 7:
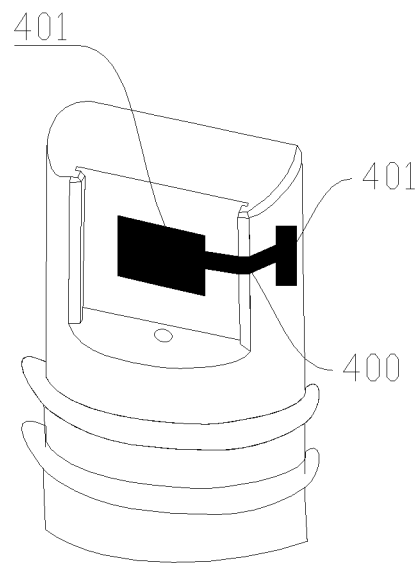
Figures 4, 5, 6, 7, 8:
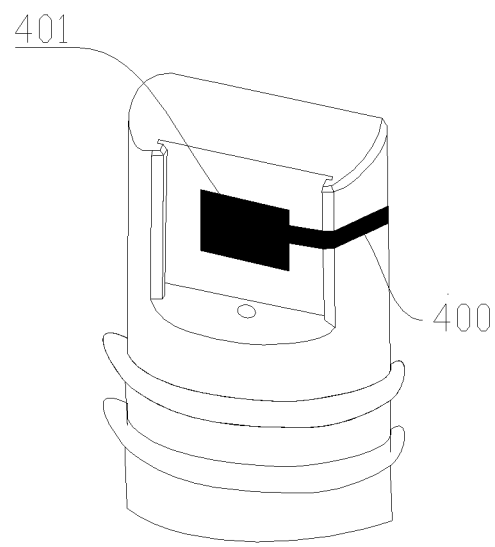
Figures 4, 5, 6, 7, 8, 9:
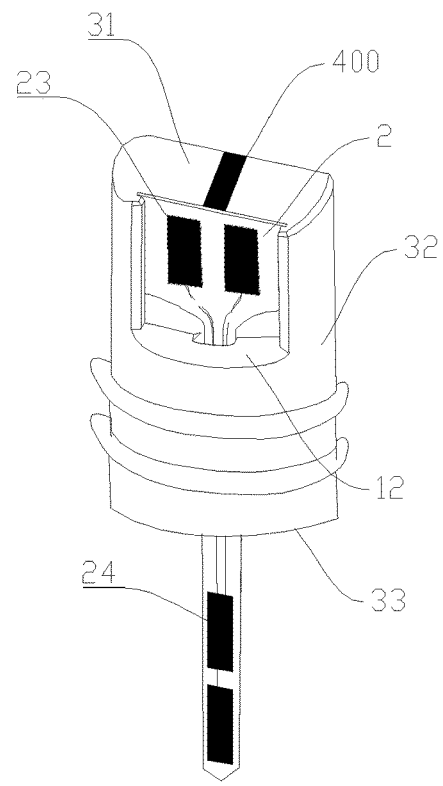
Figures 4, 5, 6, 7, 8, 9, 10:
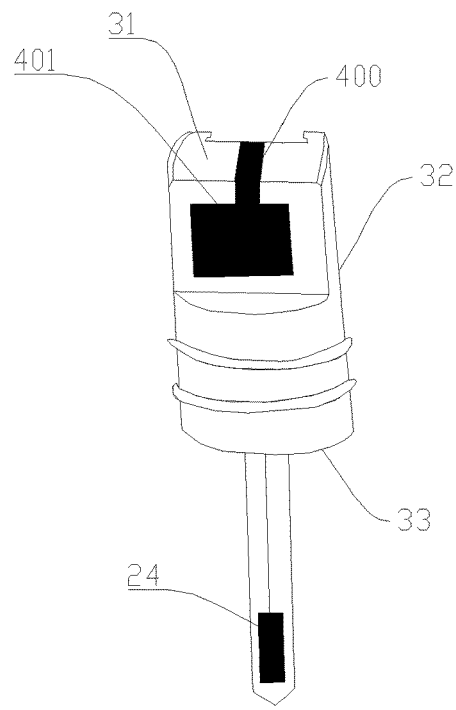
Figure 5:
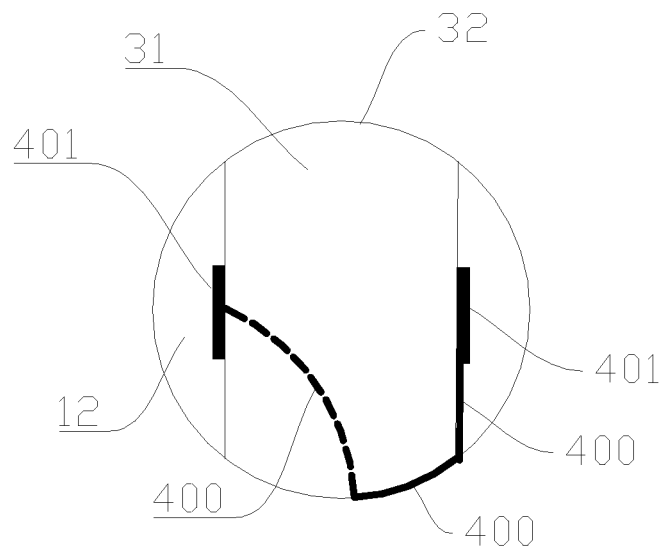
Figure 6:
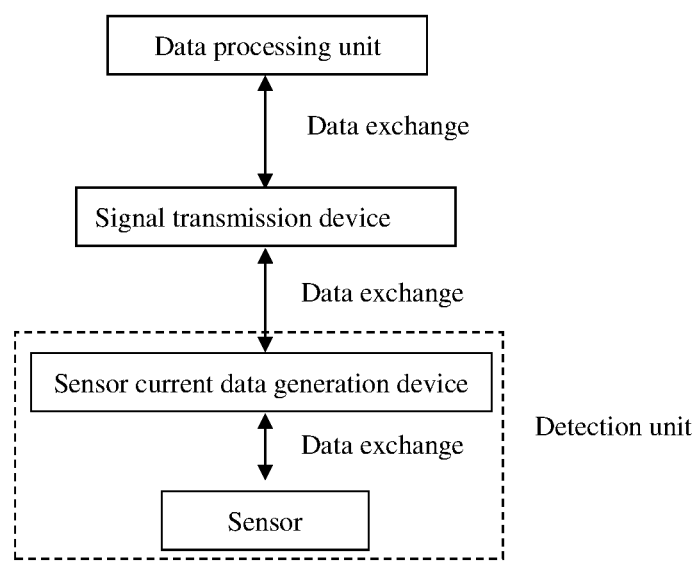

An implantable analyte sensor system (which can be used to continuously monitor the concentrations of analytes in human blood, the analytes including but not limited to glucose, sodium ions and potassium ions), as shown in FIG. 6, includes a detection unit, a signal transmission device, and a data processing unit.

The detection unit and the signal transmission device are fixed in a housing, the housing plays a role in protecting internal electronic components, and a power source (not shown in the figure) is further provided in the housing to supply power to the electronic components in the housing.

The detection unit includes an implantable analyte sensor 2, a fixing member for fixing the implantable analyte sensor, and a sensor current data generation device. The sensor 2 in the present invention is preferably a sensor with double-sided microelectrodes, and a sensor with single-sided electrodes is also applicable.

Figure 1:
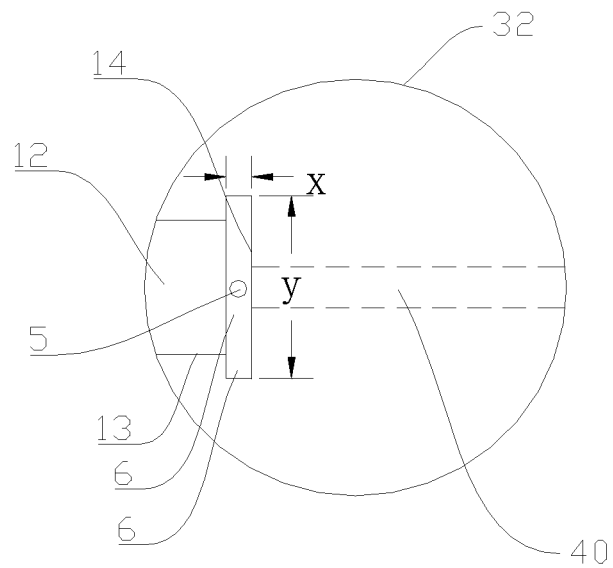
FIG. 1 is a schematic structural diagram of front and back sides of a sensor.

Generally, as shown in FIG. 1, the sensor 2 with double-sided microelectrodes includes a back side (the side in contact with the inner wall of a receiving portion is referred to as the back side) and a front side, an electrode interface 23 is respectively provided at upper ends of the front and back sides, and functional electrodes, such as a working electrode 241, a counter electrode 242 and a reference electrode 243, are provided at lower ends, wherein the working electrode 241 and the counter electrode 242 are placed on the front side of the sensor 2, and the reference electrode 243 is placed on the back side of the sensor 2. The working electrode 241, the counter electrode 242 and the reference electrode 243 are respectively connected to the electrode interfaces 23 through conductive traces, so that the working electrode 241, the counter electrode 242 and the reference electrode 243 transmit signals to other related components through the electrode interfaces 23. The part where the functional electrodes are placed is summarized as an electrode region 22, and the part where the electrode interfaces 23 are placed is summarized as an interface region 21. The electrode region 22 and the interface region 21 are both marked with boxes in the figure. The sensor with double-sided electrodes described above is only of a relatively common structure, and a person skilled in the art can selectively change the arrangement of these functional electrodes, or add other functional electrodes for measuring pH, temperature, etc.

Figure 3:
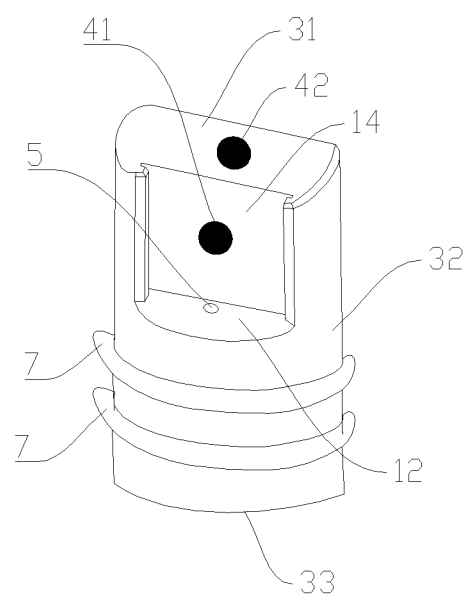
Figures 2, 3:
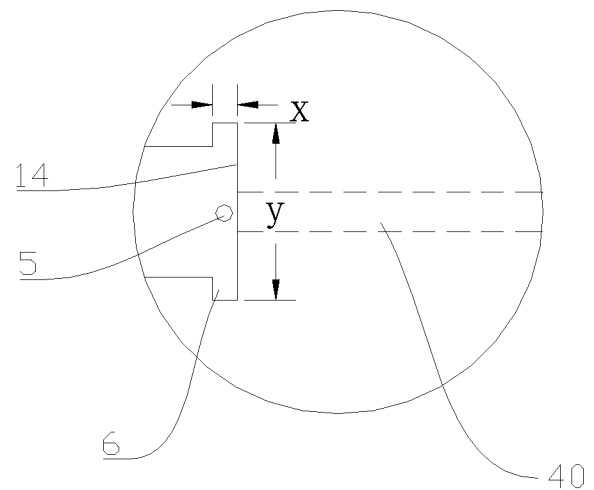
Figure 3:
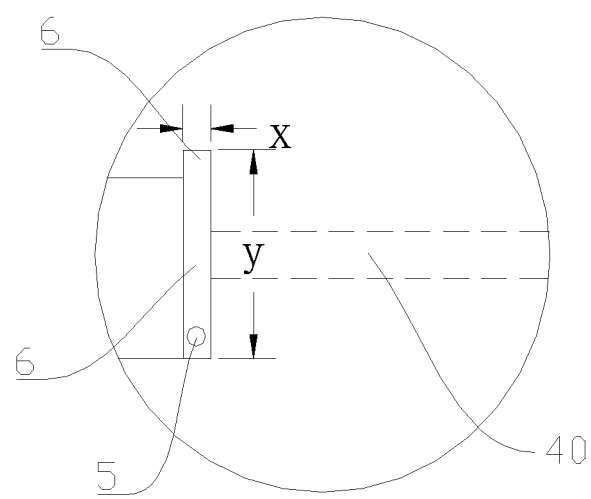

As shown in FIGS. 2-1-b, 2-1-e, 2-2-a, 2-2-b, 4-1, 4-3 and 4-6, the fixing member for the implantable analyte sensor according to the present invention includes a supporting portion 3, a receiving portion 1, a conductive path 400 and a through hole 5. The supporting portion 3 is composed of a supporting portion top 31, supporting portion side walls 32 and a supporting portion bottom 33. The receiving portion 1 is arranged on the supporting portion side walls 32 in a recessed manner and is preferably close to the supporting portion top 31, and the receiving portion 1 is used to receive the interface region 21 of the sensor 2. The receiving portion 1 includes receiving portion side walls 13, a receiving portion bottom 12, a receiving portion inner wall 14, and a receiving portion top. The receiving portion top is arranged opposite to the receiving portion bottom, and can be closed or open. The receiving portion side walls 13 and the receiving portion bottom 12 are respectively used to limit the left and right movement of the interface region 21 of the sensor 2 and the movement of the supporting portion bottom 33.

The through hole 5 extends from an opening in the receiving portion bottom 12 to an opening in the supporting portion bottom 33 in a penetrating manner. Accordingly, the electrode region 22 of the sensor 2 enters from the receiving portion bottom 12, and finally extends out from the supporting portion bottom 33. The conductive path 400 includes a receiving end 41 and an output end 42, the receiving end 41 and the output end 42 are connected by a connecting portion made of a conductive material. The total number of the receiving end 41 and the output end 42 is not less than two, the receiving end 41 is used to receive data information from the sensor 2, and the output end 42 outputs the information to other electronic components, such as a central processing unit. The receiving end 41 is located on the receiving portion inner wall 14, the output end 42 is located on the supporting portion side wall 32, and the receiving end 41 and the output end 42 are electrically connected.

In one embodiment, as shown in FIGS. 2-1-b, 2-1-e, 2-2-a, 2-2-b, 4-1, 4-3 and 4-6, the receiving portion 1 is composed of a receiving portion top opening 11, receiving portion side walls 13, a receiving portion bottom 12, and a receiving portion inner wall 14. During use, the interface region 21 of the sensor 2 enters from the receiving portion top opening 11 and moves down along the receiving portion side wall 13, while the electrode region 22 below the interface region 21 enters from the through hole 5 of the receiving portion bottom 12. Finally, the interface region 21 is blocked by the receiving portion bottom 12 and stops moving, while the electrode region 22 extends out from the supporting portion bottom 33 and is located below the supporting portion bottom 33.

The receiving portion top is in an open state to form the receiving portion top opening 11, as shown in FIG. 2-1-a. The opening 11 provides an entrance for the insertion of the sensor 2, which facilitates the insertion of the sensor 2. The receiving portion top opening is open in the following embodiments.

The fixing member is fixed on a base of the housing, and the base is provided with a hole corresponding to the through hole 5 for the electrode region 22 of the implantable analyte sensor 2 to pass through. The test electrodes such as the working electrode 241, the counter electrode 242 and the reference electrode 243 that are implanted in the human body are summarized as the electrode region 22.

The electrode region 22 of the implantable analyte sensor 2 is implanted under human skin via the through hole 5, the interface on the back side of the implantable analyte sensor 2 is electrically connected to the sensor current data generation device through the conductive path 400, and other existing conductive materials can also be added between the conductive path 400 and the sensor current data generation device for electrical connection. The interface on the front side of the implantable analyte sensor 2 is electrically connected by an existing conductive material, and the conductive material includes but is not limited to graphite, a conductive tape and a copper wire.

Data is exchanged between the signal transmission device and the sensor current data generation device, and the two can exchange data by means of a data line or wireless signals (existing wireless data exchange modes such as Bluetooth, WiFi, and radio-frequency signals). In order to implement any of the data transmission modes in the prior art, the signal transmission device requires corresponding components in the prior art.

Data is exchanged between the data processing unit and the signal transmission device, and the two can exchange data by means of a data line or wireless signals.

The sensor current data generation device controls the implantable analyte sensor through electrical signals to test subcutaneous analytes, and receives data generated by the implantable analyte sensor 2, and the received data is transmitted to the data processing unit by the signal transmission device for processing and display. For example, a micro processing chip on the market can achieve this function.

The data processing unit may be an intelligent terminal (a smart phone, a computer, a tablet, etc.), or a component including a display screen and a data processing chip, wherein the data processing chip is installed in the housing, and the display screen is installed on the housing.

In the above-mentioned implantable analyte sensor system, except the fixing member, other components and connection mode have no creative technical features.

The present invention provides a fixing member for an implantable analyte sensor, which is used for fixing the analyte sensor, and is particularly suitable for a sensor with double-sided microelectrodes.

The cross section of the through hole 5 may be triangular, circular or semicircular, for an implantable portion (including the electrode region) of the sensor 2 to pass through.

The implantable portion is inserted into the human skin after passing through the through hole 5, and the number of the through hole 5 is one. The through hole 5 is equidistant from the two receiving portion side walls 13 of the receiving portion 1, as shown in FIGS. 3-1 and 3-2; and it can also be offset to one side, as shown in FIG. 3-3. Since the sensor 2 may not be enough to pierce the skin, it needs to be combined with a common puncture needle in the art, so that the test electrodes of the sensor 2 can be successfully implanted under the skin.

As shown in FIGS. 2-1-*b*, 2-1-*e*, 2-2-*a*, 2-2-*b*, 4-1, 4-3 and 4-6, the receiving end 41 of the conductive path 400 is used to contact the electrode interface 23 on the back side of the sensor 20 to receive information from the sensor 2. The output end 42 is used to output the information to other electronic components.

In some embodiments, the conductive path 400 has two output ends, as shown in FIG. 4-5. In this embodiment, the output ends are a first output end 421 and an output end 422. Or the conductive path 400 can have three or more output ends. The number of the conductive path 400 is at least one, or may be two or more, and the number is related to the number of the electrode interface on the back side of the sensor 2. If one temperature sensing electrode is added on the back side, one conductive path needs to be added. When the number of the conductive paths 400 is more than one, the conductive paths 400 may be arranged in the same layout mode, or in multiple modes. The material of the conductive path 400 may be a conductive metal, a conductive polymer, or other conductive material (such as graphite), and the shape thereof may be selectively linear, columnar, flaky, etc.

In the following embodiments, the present invention takes a conductive path 400 having an input end 41 and an output end 42, specifically a first end portion 41 and a second end portion 42, as an example. The first end portion 41 is located on the receiving portion inner wall 14 and between the electrode interface 23 of the back electrode and the fixing member, and the second end portion 42 is located on the other side of the fixing member and connected to corresponding interface of the sensor current data generation device. In order to better contact the electrode interface 23, the first end portion 41 needs to slightly protrude from the receiving portion inner wall 14, and the protruding distance is more than 0 mm, preferably 0.01 to 1 mm, and more preferably 0.01 to 0.5 mm.

The back electrode refers to an electrode facing the receiving portion inner wall 14. In the present invention, the right side of FIG. 1 is regarded as the back side. Of course, if the left side of FIG. 1 faces the receiving portion inner wall 14, this side is the back side. The technical solutions of the present invention are all described by taking the right side of FIG. 1 as the back side as an example, the reference electrode 143 is distributed on the back side, and the counter electrode 242 and the working electrode 241 are distributed on the other side. In addition, the counter electrode 242, the working electrode 241, and the reference electrode 243 are common technologies in the field of electrochemical analysis, and have no other creative technical features.

In a preferred embodiment, referring to FIGS. 2-1, 2-2, 3-1 to 3-3, and 4-1 to 4-10, the receiving portion 1 is composed of receiving portion side walls 13, a receiving portion top opening 11, a receiving portion bottom 12 and a receiving portion inner wall 14, a groove 6 is provided in the receiving portion 1, and the groove 6 is used to fit an edge of the interface region 21 of the sensor. As a preference, the groove 6 is located on the receiving portion bottom 12 and is in contact with the receiving portion inner wall 14, and the opening of the through hole 5 is located in the groove 6, as shown in FIG. 3-1 and FIG. 3-3, so as to fit the lower edge of the interface region 21 and further fix and limit the interface region 21. As another preference, a groove 6 is provided on one receiving portion side wall 13 (as shown in FIGS. 3-1 and 3-3) or two receiving portion side walls 13 (as shown in FIGS. 2-1-*a* and 3-2) of the receiving portion 1, and the groove 6 is in contact with the receiving portion inner wall 14. When the sensor 2 is inserted into the fixing member, the groove 6 on the receiving portion side wall 13 can play a guiding role, which facilitates the entry of the electrode region 22 into the through hole 5. After the sensor 2 is inserted into the fixing member, the groove 6 can further fix and limit the movement of the interface region 21.

In the present invention, the fixing member may further include a connecting portion (not shown in the figures). The connecting portion is used to fix the fixing member to the base of the analyte detection device, and the fixing mode may be a removable mode (buckling, screwing, or inserting and extracting) or a non-removable mode (bonding with an adhesive, or integrating with the base). The fixing mode of buckles is optimal.

During use, the sensor 2 can be directly inserted into a corresponding position of the fixing member or extracted therefrom. In this way, the sensor 2 can be quickly replaced, which not only reduces the time for replacement, but also simplifies the steps of replacement.

The analyte detection device refers to a device that includes a detection unit, a signal transmission device and a power source, and is fixed to the skin by bonding, binding, or the like.

In the present invention, the fixing member may further include a sealing ring 7, for example, an O-shaped rubber ring as shown in FIG. 2-1, which can also be replaced by a hydrophobic film or other existing materials with a sealing effect. The number of the sealing ring is at least one, and the sealing ring is arranged on the supporting portion side wall in a surrounding manner and located below the receiving portion bottom.

The sealing ring 7 is used for waterproofing, specifically, to prevent water from permeating (into the inside of) the monitoring device when the fixed part of the human body touches water (for example, bathing, swimming, etc.) to affect the internal electronic components.

The number of the groove 6 is 1 to 3, and the groove(s) 6 is/are located on the receiving portion side walls 13, or the receiving portion bottom 12, or a combination of the two. The distribution of some grooves 6 can be referred to FIGS. 2-1, 2-2 and 3-1 to 3-3. The groove 6 is used for positioning the interface region 21 of the sensor 2 and limiting the movement of the interface region 21, and the groove 6 on the side wall 13 also has an effect of guiding the insertion of the interface region 21. As shown in FIGS. 3-1 to 3-3, the width x of the groove 6 is greater than the edge thickness of the interface region 21, and the difference is more than 0 mm and less than or equal to 0.5 mm, and further can be 0.05 to 0.2 mm, preferably 0.1 mm, which prevents difficult insertion caused by too small difference, and also prevents the reduction of the effect of limiting the interface region 21 due to too large difference. Similarly, the width y of the receiving portion inner wall 14 is greater than the length of the interface region 21, and the difference is more than 0 mm and less than or equal to 0.5 mm, and further can be 0.05 to 0.2 mm, preferably 0.1 mm, which prevents difficult insertion caused by too small difference, and also prevents the reduction of the effect of limiting the interface region 21 due to too large difference. The width y of the receiving portion inner wall is within a numerical range of 2 to 5 mm.

As shown in FIGS. 2-1-*c*, 2-1-*f*, 2-1-*h*, 4-2, 4-4, 4-7, 4-8 and 4-10, the material used for conductive sheets 401 may be a conductive metal, a conductive polymer, or other conductive material (such as graphite). The number of the conductive sheets 401 may be one or more. The conductive sheet(s) 401 is/are electrically connected to one or more end portions of the conductive path 400, respectively. When the connection strength needs to be increased, the conductive sheet(s) 6 can be electrically connected to the first end portion 41 and/or the second end portion 42 by means of a conductive bonding material (a conductive glue, or a conductive tape). When the conductive sheet 401 is connected to the first end portion 41, the first end portion 41 can be better conductively connected to the electrode interface 23 of the back electrode; and when the conductive sheet 401 is connected to the second end portion 42, the conductivity between the second end portion 42 and the sensor current data generation device is more stable and excellent.

In the present invention, the conductive path 400 can penetrate the receiving portion 1 of the fixing member, so that the two ports of the conductive path 400 are respectively located on the receiving portion inner wall 14 and the supporting portion side wall 32/supporting portion top 31. Specifically, the fixing member is provided with a conductive hole 40, as shown in FIGS. 2-1-*a,* 2-1-d, and 3-1 to 3-3. The conductive hole 40 is used for the conductive path 400 to pass through, so that the first end portion 41 of the conductive path 400 points to the receiving portion inner wall 14 of the fixing member. The second end portion 42 of the conductive path 400 is located on the other surface of the supporting portion 3, for example, the second end portion 42 is located on the back side of the supporting portion side wall 32 opposite to the receiving portion 1 in FIG. 2-1-*e*. But this does not mean that the second end portion 42 must be located on this surface. The second end portion 42 may also be located on a lateral side of the supporting portion side wall 32 opposite to the receiving portion 1, as shown in FIG. 2-2-*a*. And in another embodiment, the conductive path 400 penetrates the supporting portion 3, and the second end portion 42 is located at the supporting portion top 31, as shown in FIG. 2-2-*b*.

In one embodiment, a conductive sheet 401 is provided between the first end portion 41 and the back electrode of the sensor 2, the electrode interface 23 of the back electrode is electrically connected to the conductive sheet 401, the first end portion 41 is electrically connected to the conductive sheet 401, and the conductive sheet 401 is located on the surface of the receiving portion inner wall 14, as shown in FIG. 2-1-*g*.

In one embodiment, the second end portion 42 is located on the back side of the supporting portion side wall 32 of the receiving portion 1, so as to be electrically connected to the interface of the sensor current data generation device, as shown in FIG. 2-1-*e*.

In one embodiment, a conductive sheet 401 is provided on the back side of the supporting portion side wall 32 opposite to the receiving portion 1, the second end portion 42 is electrically connected to the conductive sheet 401, and the conductive sheet 401 can also be electrically connected to the interface of the sensor current data generation device and increase the connection strength of electrical signals, as shown in FIG. 2-1-*h*.

In one embodiment, the conductive hole 40 is of a curve or a broken line, the first end portion 41 of the conductive path 400 points to the receiving portion inner wall 14, and the second end portion 42 points to the supporting portion side wall 32 or the supporting portion top 31, as shown in FIG. 5.

In a preferred embodiment, a conductive sheet 401 is provided between the first end portion 41 and the back electrode of the sensor 2, a conductive sheet 401 is also provided on the back side of the fixing member, the second end portion 42 is electrically connected to the conductive sheet 401, and the effect after the sensor 2 is inserted into the fixing member 10 is as shown in FIGS. 2-1-*g* and 2-1-*h*.

In the present invention, the conductive path 400 may be located on the outer surface of the fixing member, and the two ports of the conductive path 400 are respectively located on the receiving portion inner wall 14 and the supporting portion side wall 32 or the supporting portion top 31, that is, one port is located on the receiving portion inner wall 14, and the other port is located on the supporting portion side wall 32 or the supporting portion top 31. At this time, no conductive hole 40 is provided in the fixing member, and the conductive path 400 is distributed along the surface of the receiving portion fixing member, so that the first end portion 41 of the conductive path 400 is located on the receiving portion inner wall 14 (as shown in FIGS. 4-1, 4-2, 4-7, and 4-8), the second end portion 42 is located on the supporting portion top 31 (as shown in FIG. 4-3), or the second end portion 42 is located on the lateral side of the supporting portion side wall 32 opposite to the receiving portion 1 (as shown in FIGS. 4-6 and 4-7), or the second end portion 42 is located on the back side of the supporting portion side wall 32 opposite to the receiving portion 1 (as shown in FIGS. 4-4, 4-5 and 4-10). In order to increase the adhesion strength of the conductive path 400 on the surface of the fixing member, an adhesive layer can be provided between the conductive path 400 and the surface of the fixing member or the two are bonded with an adhesive. In addition, the two may be fixed by inlaying.

In the present invention, a part of the conductive channel 400 may penetrate the supporting portion 3, and the other part may be located on the outer surface of the supporting portion side wall 32. In addition, the first end portion 41 of the conductive channel 400 is located on the receiving portion inner wall 14, and the second end portion 42 is located on the lateral side or back side of the supporting portion side wall 32. For example, as shown in FIG. 5, a part (the black dotted line part) of the conductive path 400 penetrates through the fixing member, and the other part (the black solid line part) extends along the surface of the supporting portion side wall 32 to the back side of the supporting portion side wall 32, or to the supporting portion top 31 or the lateral side of the supporting portion side wall 32, and vice versa.

The invention claimed is:

1. A fixing member for an implantable analyte sensor, comprising:
    a supporting portion, a receiving portion, a conductive path, and a through hole; wherein
        the supporting portion comprises supporting portion side walls, a supporting portion top and a supporting portion bottom,
        the receiving portion is located in the supporting portion side walls in a recessed manner, and comprises receiving portion side walls, a receiving portion inner wall, a receiving portion bottom and a receiving portion top,
        the conductive path comprises an input end located on the receiving portion inner wall and an output end located on a surface of the supporting portion,
        the input end and the output end are operably electrically connected to one another,
        a first opening of the through hole is located at the receiving portion bottom, and a second opening of the through hole is located at the supporting portion bottom, and the receiving portion is configured to receive an interface region of the implantable analyte sensor and to operably electrically connect the input end of the conductive path to the interface region of the implantable analyte sensor.

2. The fixing member for an implantable analyte sensor according to claim 1, wherein the receiving portion top is open.

3. The fixing member for an implantable analyte sensor according to claim 2, wherein, a conductive sheet is provided on the receiving portion inner wall or on the surface of the supporting portion, and the conductive sheet is electrically connected to the input end.

4. The fixing member for an implantable analyte sensor according to claim 1, wherein, the input end protrudes from the receiving portion inner wall, or protrudes from the surface of the supporting portion.

5. The fixing member for an implantable analyte sensor according to claim 4, wherein, a conductive sheet is provided on the receiving portion inner wall or on the surface of the supporting portion, and the conductive sheet is electrically connected to the output end.

6. The fixing member for an implantable analyte sensor according to claim 1, wherein,
a conductive sheet is provided on the receiving portion inner wall, and the conductive sheet is electrically connected to the input end;
or a conductive sheet is provided on the surface of the supporting portion, and the conductive sheet is electrically connected to the output end;
or a conductive sheet is respectively provided on the receiving portion inner wall and the surface of the supporting portion, and the conductive sheets are electrically connected to the input end and the output end, respectively.

7. The fixing member for an implantable analyte sensor according to claim 1, wherein,
a groove is provided on the receiving portion bottom;
or a groove is provided on the receiving portion side wall;
or a groove is provided on the receiving portion bottom and the receiving portion side wall.

8. The fixing member for an implantable analyte sensor according to claim 7, wherein,
the second opening of the through hole is provided in the groove at the receiving portion bottom.

9. An implantable analyte sensor system, comprising:
a detection unit, a signal transmission device, and a data processing unit, wherein,
the detection unit and the signal transmission device are fixed in a housing, and a power source is further provided in the housing to supply power to electronic components in the housing; and
the detection unit comprises an implantable analyte sensor, the fixing member for fixing the implantable analyte sensor according to claim 1, and a sensor current data generation device.

10. The implantable analyte sensor system according to claim 9, wherein, the receiving portion top is open.

11. The implantable analyte sensor system according to claim 9, wherein, the input end protrudes from the receiving portion inner wall or the surface of the supporting portion.

12. The implantable analyte sensor system according to claim 9, wherein, a conductive sheet is provided on the receiving portion inner wall or the surface of the supporting portion, and the conductive sheet is electrically connected to the output end.

13. The implantable analyte sensor system according to claim 9, wherein, a conductive sheet is provided on the receiving portion inner wall or the surface of the supporting portion, and the conductive sheet is electrically connected to the output end.

14. The implantable analyte sensor system according to claim 9, wherein, a conductive sheet is provided on the receiving portion inner wall or the surface of the supporting portion, and the conductive sheet is electrically connected to the output end.

15. The implantable analyte sensor system according to claim 9, wherein, a groove is provided on the receiving portion bottom or the receiving portion side wall.

16. The implantable analyte sensor system according to claim 15, wherein, the second opening of the through hole is provided in the groove at the receiving portion bottom.

* * * * *